(12) United States Patent
Merrell et al.

(10) Patent No.: US 7,694,080 B2
(45) Date of Patent: Apr. 6, 2010

(54) METHOD AND APPARATUS FOR PROVIDING A LOW POWER MODE FOR A PROCESSOR WHILE MAINTAINING SNOOP THROUGHPUT

(75) Inventors: Quinn W. Merrell, Phoenix, AZ (US); R. Frank O'Bleness, Tempe, AZ (US); Sujat Jamil, Austin, TX (US); Hang T. Nguyen, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 281 days.

(21) Appl. No.: 11/027,649

(22) Filed: Dec. 29, 2004

(65) Prior Publication Data

US 2006/0143409 A1    Jun. 29, 2006

(51) Int. Cl.
| | |
|---|---|
| G06F 12/00 | (2006.01) |
| G06F 13/00 | (2006.01) |
| G06F 13/28 | (2006.01) |
| G06F 1/26 | (2006.01) |
| G06F 1/32 | (2006.01) |
| G06F 1/00 | (2006.01) |

(52) U.S. Cl. .................. 711/146; 713/320; 713/322; 711/118

(58) Field of Classification Search .................. None
See application file for complete search history.

(56) References Cited

U.S. PATENT DOCUMENTS

| | | | |
|---|---|---|---|
| 5,537,581 A * | 7/1996 | Conary et al. ............... 713/501 |
| 5,632,038 A * | 5/1997 | Fuller ......................... 713/324 |
| 5,918,061 A * | 6/1999 | Nikjou ........................ 713/324 |
| 6,021,466 A * | 2/2000 | Olarig ......................... 711/122 |
| 6,845,456 B1 * | 1/2005 | Menezes et al. ............. 713/320 |
| 2002/0087225 A1 * | 7/2002 | Howard ....................... 700/94 |

* cited by examiner

*Primary Examiner*—Matt Kim
*Assistant Examiner*—Ralph A Verderamo, III
(74) *Attorney, Agent, or Firm*—Thomas R. Lane

(57) ABSTRACT

A method and apparatus for providing a low power mode for a processor while maintaining snoop throughput are disclosed. In one embodiment, an apparatus includes a cache, a processor, and a frequency controller. The frequency controller is to operate the apparatus in a low power mode in which the operating frequency of the cache is higher than the operating frequency of the processor.

14 Claims, 3 Drawing Sheets

METHOD AND APPARATUS FOR PROVIDING A LOW POWER MODE FOR A PROCESSOR WHILE MAINTAINING SNOOP THROUGHPUT

BACKGROUND

1. Field

The present disclosure pertains to the field of power management in data processing systems with cache memories.

2. Description of Related Art

One technique for reducing power consumption and heat generation in data processing systems includes reducing the operating frequency of a processor. In many systems, there is a cache memory to support the processor, and, particularly in multiprocessor systems, the cache must be snooped in order to maintain cache coherency. A cache "supports" a processor if the processor normally (e.g., excepting snoop and inquiry accesses) presents memory accesses to cacheable memory space to the cache, or if the cache is a cache at a lower (further from the processor) level in the memory hierarchy that is inclusive with respect to the cache to which the processor normally presents memory accesses to cacheable memory space.

In a system where a processor is supported by a cache that must be snooped to maintain cache coherency, a reduction in the processor's operating frequency may decrease system performance by adding latency to the snoop requests from the system bus.

BRIEF DESCRIPTION OF THE FIGURES

The present invention is illustrated by way of example and not limitation in the accompanying figures.

DETAILED DESCRIPTION

The following description describes embodiments of techniques for providing a low power mode for a processor while maintaining snoop throughput. In the following description, numerous specific details, such as component and system configurations, may be forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

Embodiments of the present invention include techniques for providing a low power mode for a processor while maintaining snoop throughput, and may be applied to any processor supported by a cache that is snooped to maintain cache coherency, regardless of any other attributes of or protocol related to the cache. For example, the techniques may be applied to a level two ("L2") cache where the processor is also supported by a level one ("L1") cache, and may be applied to processors in multiprocessor systems and to multicore processors.

Figure 1:
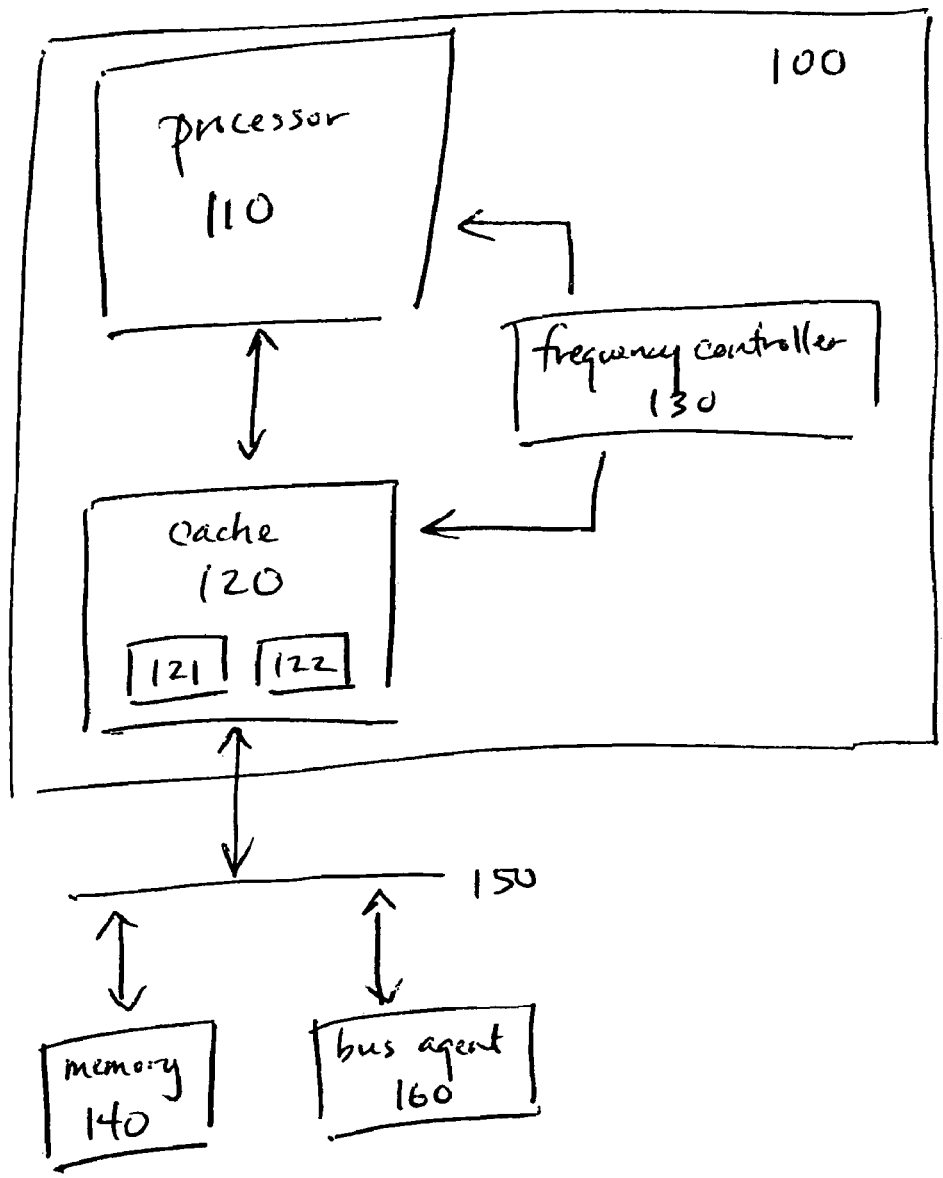
FIG. 1 illustrates an embodiment of an apparatus for providing a low power mode for a processor while maintaining snoop throughput.

FIG. 1 illustrates an embodiment of an apparatus 100 for providing a low power mode for a processor 110 while maintaining snoop throughput. In this embodiment, apparatus 100 is an integrated circuit fabricated on a single silicon die.

Processor 110 may be any of a variety of different types of processors that are supported by a cache. For example, the processor may be a general purpose processor such as a processor in the Pentium® Processor Family, the Itanium® Processor Family, or other processor family from Intel Corporation, or another processor from another company.

Apparatus 100 also includes a cache 120 supporting processor 110, and a frequency controller 130. In this embodiment, cache 120 is a level one cache of any size, connected to a main memory 140 by system bus 150. Bus agent 160 is also connected to main memory 140 by system bus 150. Main memory 140 may be any type of memory, such as dynamic or static random access memory. Bus agent 160 may be another processor, an input/output device, or any other agent that may access main memory 140. In other embodiments, cache 120 and bus agent 160 may be connected to main memory by different buses, through system or peripheral controllers, by point to point connections, or by any other means.

Cache 120 may include cache controller 121 and cache queue 122. Cache controller 121 controls access to cache 120. Cache queue 121 may be a queue, a buffer, or any other memory element for temporarily storing data or addresses of data to be loaded into cache 120. Cache 120 follows a cache protocol requiring that it be snooped to maintain cache coherency. For example, cache 120 may be a write-back cache which must be snooped to determine if a memory access by bus agent 160 hits a line stored in cache 120.

Frequency controller 130 controls the operational frequencies of processor 110 and of cache 120 to operate apparatus 100 in one of two modes, a normal mode and a low power mode. In the normal mode, processor 110 and cache 120 operate at the same frequency, which is a multiple of the frequency of system bus 150. In the low power mode, the operational frequency of processor 110 is reduced to a lower multiple of the system bus frequency, but the operational frequency of cache 120 remains at the higher multiple of the system bus frequency. Therefore, in the low power mode, processor 110 may consume less power and generate less heat, but snoop throughput may be maintained because cache 120 may continue to respond to snoop requests with no greater latency than when apparatus 100 is in normal mode.

Frequency controller 130 may switch apparatus 100 from normal mode to low power mode, and vice versa, according to any known power management protocols or techniques. For example, frequency controller may include or be responsive to power management logic, a register, or a signal that determines or indicates that a low power state may be entered because processor 110 is inactive, the maximum performance of processor 110 is not required, power supply or thermal management issues exist, or for any other reason. The operational frequency of processor 110 may be changed by clock throttling, an adjustment to a phase locked loop, or any other known technique.

Frequency controller 130 is not necessary within the scope of the present invention. For example, in another embodiment, the processor may be hardwired or configured to constantly operate at a lower frequency than the cache without a frequency controller. Alternatively, a frequency controller may be used to operate the processor at a lower frequency than the cache, but not to switch the apparatus to another mode.

Figure 2:
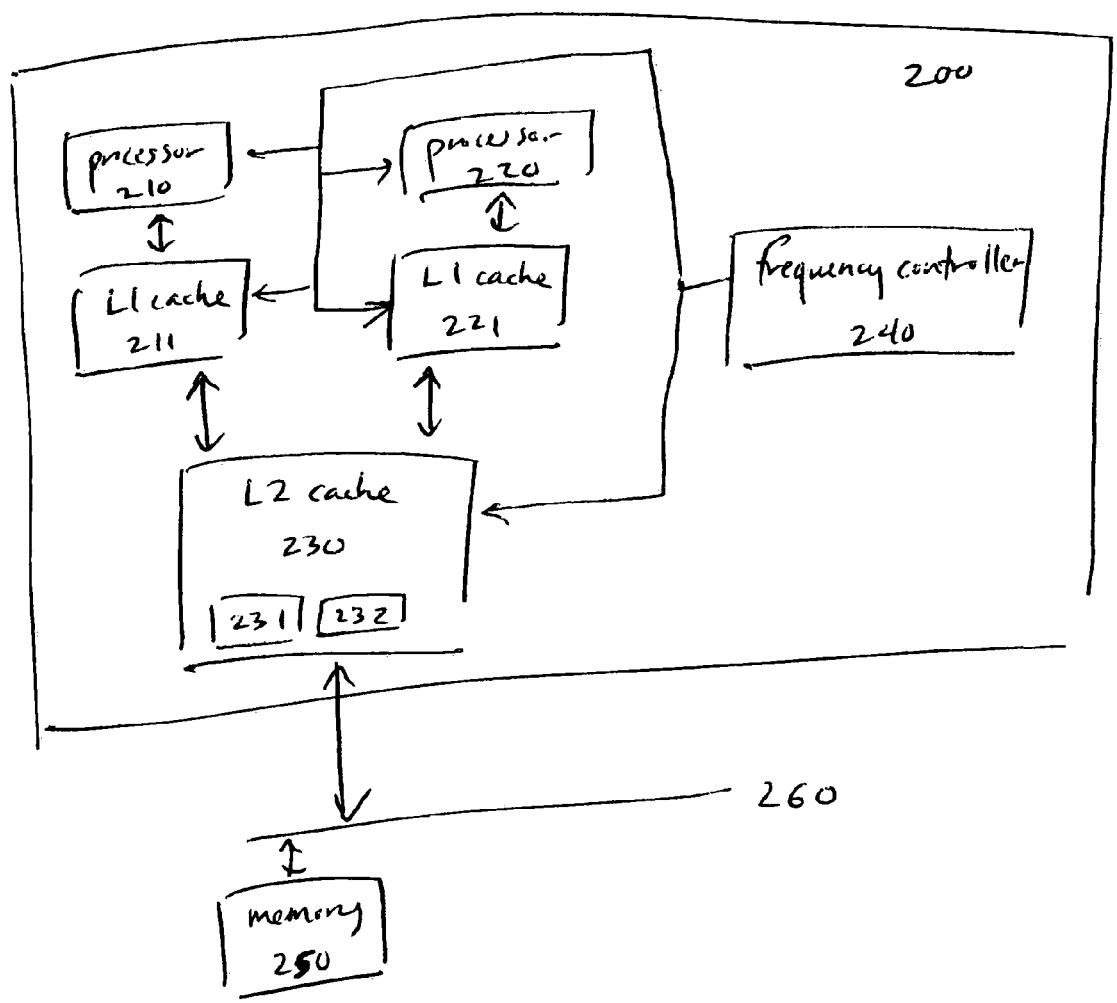
FIG. 2 illustrates an embodiment of a multiprocessor apparatus for providing a low power mode while maintaining snoop throughput in a multiprocessor system.

FIG. 2 illustrates an embodiment of a multiprocessor apparatus 200 for providing a low power mode while maintaining snoop throughput. Multiprocessor apparatus 200 may be a chip multiprocessor in which multiple processing cores are fabricated on a single silicon die or other substrate for fabricating integrated circuits, or a multiple chip package, module, card, board, or the like.

Multiprocessor apparatus 200 includes processor 210, processor 220, L1 cache 211, L1 cache 221, L2 cache 230, and frequency controller 240. L1 cache 211 is associated with processor 210, and L1 cache 221 is associated with processor 220. L2 cache 230 is shared by processors 210 and 220.

The L1 caches are associated with their respective processors because each processor normally (e.g., excepting snoop and inquiry accesses) presents memory accesses to cacheable memory space to its associated cache. The associated caches are separate and distinct from each other and from any other caches. Typically, an associated cache is located in close physical proximity to the processor to which it is associated, closer than it is to any other processor. Multiprocessor apparatus 200 may include any number of additional processors and associated L1 caches within the scope of the present invention.

L2 cache 230 is coupled to main memory 250 by system bus 260. L2 cache 230 may include cache controller 231 and cache queue 232. L2 cache 230 follows a cache protocol requiring that it be snooped to maintain cache coherency. However, a snoop of L2 cache 230 does not require a snoop of either L1 cache 211 or L1 cache 221, because L2 cache 230 is designed to be inclusive of all address references found in either L1 cache 211 or L1 cache 221. Although certain snoops would still need to be serviced by L1 cache 211 or L1 cache 221, L2 cache 230 may include status information so that it is able to predict the snoop response of the L1 cache or filter out all but those snoops that absolutely must be serviced by an L1 cache. Therefore, snoops to an L1 cache may be minimized.

Frequency controller 240 controls the operational frequencies of processors 210 and 220, L1 caches 211 and 221, and L2 cache 230 to operate multiprocessor apparatus 200 in any of a normal mode or a number of low power modes. In all of these modes, L1 cache 211 operates at the same frequency as processor 210, and L1 cache 221 operates at the same frequency as processor 220.

In the normal mode, processors 210 and 220, L1 caches 211 and 221, and cache 230 operate at the same frequency, which is a multiple of the frequency of system bus 260. In one low power mode, the operational frequency of processor 210 and L1 cache 211 is reduced to a lower multiple of the system bus frequency, but the operational frequencies of processor 220, L1 cache 221, and L2 cache 230 remain at the higher multiple of the system bus frequency. In another low power mode, the operational frequency of processor 220 and L1 cache 221 is reduced to a lower multiple of the system bus frequency, but the operational frequencies of processor 210, L1 cache 221, and L2 cache 230 remain at the higher multiple of the system bus frequency. In yet another low power mode, the operational frequencies of processors 210 and 220 and L1 caches 211 and 221 are reduced to a lower multiple of the system bus frequency, but the operational frequency of cache 120 remains at the higher multiple of the system bus frequency. Other modes are also possible within the scope of the present invention, for example, the operating frequencies of processors 210 and 220 could both be lowered, but to different multiples of the system bus frequency.

Figure 3:
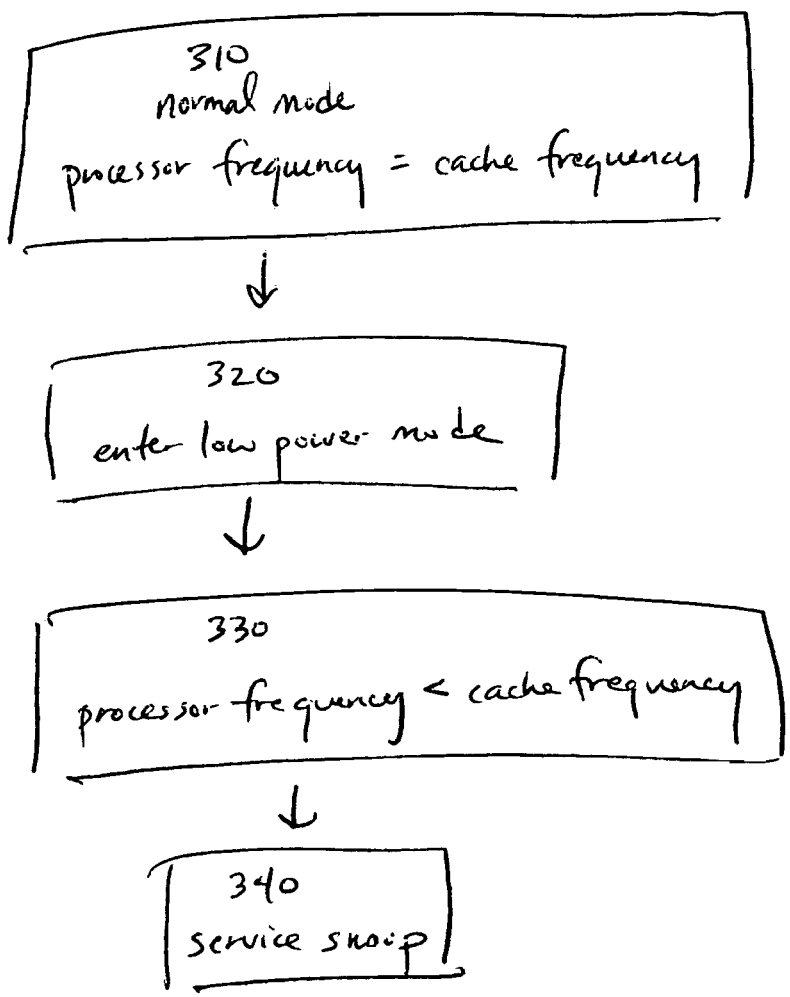
FIG. 3 illustrates an embodiment of a method for providing a low power mode for a processor while maintaining snoop throughput.

FIG. 3 is a flowchart illustrating an embodiment of a method for providing a low power mode for a processor while maintaining snoop throughput. In block 310, a processor is operating in a normal mode, wherein the processor and a cache supporting the processor operate at the same frequency.

In block 320, a condition is detected that indicates that the processor is to enter a low power mode. In block 330, the operational frequency of the processor is lowered, but the operational frequency of a cache supporting the processor is not lowered. In block 340, the cache services a snoop request with the same latency as it would have in the normal mode.

Apparatus 100, multiprocessor apparatus 200, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these mediums may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may be making copies of an article, e.g., a carrier wave, embodying techniques of the present invention.

Thus, techniques for using a dirty line hint array when flushing a cache have been disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. For example, the operational frequency of a processor could be lowered to a frequency that is not a multiple of the bus frequency, or could be lowered all the way to zero (i.e., the processor is not clocked). In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   a first cache to be coupled to a memory by a system bus;
   a first processor; and
   a frequency controller to switch the apparatus between a plurality of modes defined by the operational frequencies of the first cache and the first processor, the plurality of modes including a first mode in which the operational frequency of the first cache and the first processor is a first non-zero positive integer multiple of the system bus frequency and a second mode in which the operational frequency of the first cache is the first multiple of the system bus frequency and the operational frequency of the first processor is a second non-zero positive integer multiple of the system bus frequency, wherein the first multiple is higher than the than second multiple.

2. The apparatus of claim 1, wherein the frequency controller is also to reduce the power consumption of the apparatus by switching the apparatus from the first mode to the second mode.

3. The apparatus of claim 2, further comprising a second processor, wherein:
the first processor and the second processor share the first cache;
the second processor operates at the first frequency in the first mode and in the second mode; and
the first cache, the first processor, the second processor, and the frequency controller are included on a single die.

4. The apparatus of claim 1, further comprising a second cache, wherein:
the second cache is closer in a memory hierarchy than the first cache to the first processor, and
the second cache operates at the second frequency in the second mode.

5. The apparatus of claim 4, further comprising a memory coupled to the first cache through a system bus, wherein:
the system bus operates at a third frequency that is not higher than the second frequency; and
the first cache is to respond to a snoop request on the system bus without passing the snoop request to the second cache.

6. The apparatus of claim 1, wherein the first processor, the first cache, and the frequency controller are included on a single die.

7. The apparatus of claim 6, further comprising a second processor on the single die, wherein:
the first processor and the second processor share the first cache; and
the second processor operates at the first frequency in the second mode.

8. The apparatus of claim 7, further comprising a second cache and a third cache on the single die, wherein:
the second cache is closer than the first cache to the first processor in a memory hierarchy and operates at the second frequency in the second mode; and
the third cache is closer than the first cache to the second processor in the memory hierarchy and operates at the first frequency in the second mode.

9. A method comprising:
determining that a processor is to enter a low power mode;
reducing the operational frequency of the processor from a first non-zero positive integer multiple of a system bus frequency to a second non-zero positive integer multiple of the system bus frequency, but maintaining the operational frequency of a cache supporting the processor at the first non-zero positive integer multiple of the system bus frequency;
wherein the first non-zero positive integer multiple is greater than the second non-zero positive integer multiple; and
operating the processor in the low power mode at the reduced operational frequency.

10. The method of claim 9, further comprising servicing a snoop request to the cache in the low power mode with the same latency as when not in the low power mode.

11. A system comprising:
a processor;
a dynamic random access memory;
a cache coupled by a system bus to the dynamic random access memory to support the processor; and
a frequency controller to switch the processor and the cache between plurality of modes defined by the operational frequencies of the first cache and the first processor, the plurality of modes including a first mode in which the operational frequency of the cache and the processor is a first non-zero positive integer multiple of the system bus frequency and a second mode in which the operational frequency of the cache is the first multiple of the system bus frequency and the operational frequency of the processor is a second non-zero positive integer multiple of the system bus frequency, wherein the first multiple is higher than the than second multiple.

12. The system of claim 11, wherein the system bus operates at a third frequency that is not greater than the second frequency.

13. The system of claim 11, wherein the processor, the cache, and the frequency controller are included on a single integrated circuit.

14. The system of claim 11, wherein the frequency controller is also to reduce the power consumption of the processor by switching the processor from the first mode to the second mode.

* * * * *